(12) United States Patent
Hirano

(10) Patent No.: US 11,084,409 B2
(45) Date of Patent: Aug. 10, 2021

(54) SHAFT-SUPPORT STRUCTURE FOR ROTARY BODY

(71) Applicant: NIFCO INC., Kanagawa (JP)

(72) Inventor: Yoichi Hirano, Kanagawa (JP)

(73) Assignee: NIFCO, INC., Kanagawa (JP)

( * ) Notice: Subject to any disclaimer, the term of this patent is extended or adjusted under 35 U.S.C. 154(b) by 401 days.

(21) Appl. No.: 16/316,761

(22) PCT Filed: Jun. 20, 2017

(86) PCT No.: PCT/JP2017/022667
§ 371 (c)(1),
(2) Date: Jan. 10, 2019

(87) PCT Pub. No.: WO2018/012218
PCT Pub. Date: Jan. 18, 2018

(65) Prior Publication Data
US 2019/0232848 A1    Aug. 1, 2019

(30) Foreign Application Priority Data

Jul. 15, 2016 (JP) .............................. JP2016-140679

(51) Int. Cl.
B60N 3/10 (2006.01)
F16C 11/04 (2006.01)
F16C 35/02 (2006.01)

(52) U.S. Cl.
CPC ............. B60N 3/102 (2013.01); B60N 3/106 (2013.01); F16C 11/04 (2013.01); F16C 35/02 (2013.01)

(58) Field of Classification Search
CPC .......... B60N 3/102; B60N 3/106; B60N 3/10; F16C 11/04; F16C 11/045; F16C 35/02
See application file for complete search history.

(56) References Cited

U.S. PATENT DOCUMENTS 1,332,086 A * 2/1920 Van Sickles .......... A47L 13/512
                                                      248/113
3,233,277 A * 2/1966 Hirashiki ................. E05D 1/04
                                                       16/386
(Continued)

FOREIGN PATENT DOCUMENTS

DE   102010022442 A   12/2011
JP   S50-141852 U     11/1975
(Continued)

OTHER PUBLICATIONS

PCT IB Form 338, Notification of Transmittal of Translation of the International Preliminary Report on Patentability (Chapter I or Chapter II); The International Bureau of WIPO, Geneva, Switzerland, dated Jan. 24, 2019.

(Continued)

*Primary Examiner* — Anita M King
(74) *Attorney, Agent, or Firm* — Hammer & Associates, P.C.

(57) ABSTRACT

This shaft-support structure for a rotary body is provided with a bearing portion disposed to a base panel and a fulcrum shaft that is disposed to a cup holder and is supported by the bearing portion in a rotatable manner. The bearing portion has slits on the side apart from the base panel. A center cover is disposed at a position facing the slits. The cup holder is configured in such a way that, when a load exceeding a predetermined level is exerted in the direction away from the base panel, the fulcrum shaft moves in a direction in which the fulcrum shaft disengages from the bearing portion through the slits and, therewith, by pressing the center cover from the inside and causing the center cover to move in the direction separating from the bearing portion, the fulcrum shaft disengages from the bearing portion.

12 Claims, 11 Drawing Sheets

(56) References Cited

U.S. PATENT DOCUMENTS

| | | | |
|---|---|---|---|
| 3,389,496 A | | 6/1968 | Cremer |
| 3,389,497 A | | 6/1968 | Cremer |
| 3,389,498 A | | 6/1968 | Cremer |
| 6,116,806 A | * | 9/2000 | Chang .................. G06F 1/1616 |
| | | | 16/342 |
| 7,600,296 B1 | * | 10/2009 | Hung .................... G06F 1/1679 |
| | | | 16/337 |
| 10,640,027 B2 | * | 5/2020 | Hirano ............... B64D 11/0638 |
| 2007/0029821 A1 | | 2/2007 | Maeda |
| 2013/0092808 A1 | | 4/2013 | Adachi et al. |

FOREIGN PATENT DOCUMENTS

| | | |
|---|---|---|
| JP | 58-127315 U1 | 8/1983 |
| JP | S59-199978 A | 11/1984 |
| JP | 01-142751 UI | 12/1990 |
| JP | H05-45180 U | 6/1993 |
| JP | H08-318775 A | 12/1996 |
| JP | 3402417 B | 2/2002 |
| JP | 2002-368444 A | 12/2002 |
| JP | 2007/23641 A | 2/2007 |
| JP | 2015-202712 A | 11/2015 |
| WO | WO 2011/132754 A1 | 10/2011 |

OTHER PUBLICATIONS

PCT IB Form 373, International Preliminary Report on Patentability, with translated Written Opinion of the International Searching Authority dated Jan. 15, 2019, The International Bureau of WIPO, Geneva, Switzerland.

* cited by examiner

SHAFT-SUPPORT STRUCTURE FOR ROTARY BODY

TECHNICAL FIELD

The present invention relates to a shaft-support structure including a bearing portion disposed to a base member and a fulcrum shaft disposed to a rotary body and supported by the bearing portion in a rotatable manner, in which, with respect to the base member, the rotary body is rotated about the fulcrum shaft to a first position and a second position.

BACKGROUND ART

As a shaft-support structure of this type, for example, a technology described in PTL 1 is disclosed. In the technology described in PTL 1, when a load exceeding a predetermined level is exerted on a holder that is a rotary body, a fulcrum shaft of the holder climbing over a protrusion on an end portion of a guide groove that opens to the front side of a base member and disengaging from the guide groove causes a shaft-support component to be prevented from being damaged. Hereinafter, a structure for preventing or inhibiting a shaft-support component from being damaged in a shaft-support structure of this type is also referred to as a "shaft-support portion fail-safe structure".

CITATION LIST

Patent Literature

PTL 1: JP 3402417 B

SUMMARY OF INVENTION

Technical Problem

However, the shaft-support portion fail-safe structure described in PTL 1 has a problem in that, since the fulcrum shaft is prevented from disengaging only by the protrusion disposed on an end portion of the guide groove, the amount of load causing the fulcrum shaft to disengage from the guide groove varies widely. Thus, there is a possibility that, depending on a degree of the variation, the fulcrum shaft of the holder easily disengages from the guide groove or is hard to disengage from the guide groove. Therefore, in the technology described in PTL 1, there is room for improvement in more securely preventing or inhibiting a shaft-support component, such as a fulcrum shaft of a holder, from being damaged when a load exceeding a predetermined level is exerted on a rotary body.

In the technology described in PTL 1, there is also a problem in that, since an end portion of a guide groove opens at a position visible from the front side, a groove of a bearing portion is visible from the front side, which spoils external appearance.

Accordingly, the present invention has been made in view of such problems, and a problem to be solved by the present invention is to provide a shaft-support structure for a rotary body that is capable of more securely preventing or inhibiting a shaft-support component of a rotary body from being damaged when a load exceeding a predetermined level is exerted on the rotary body.

Solution to Problem

In order to achieve the object mentioned above, according to an aspect of the present invention, there is provided a shaft-support structure for a rotary body, the shaft-support structure including: a bearing portion disposed to a base member; and a fulcrum shaft disposed to the rotary body and supported by the bearing portion in a rotatable manner, the rotary body being rotated with respect to the base member about the fulcrum shaft to a first position and a second position, the shaft-support structure including: a slit disposed to the bearing portion and opened in a direction away from the base member; and a restricting member disposed at a position facing the slit in such a way as to cover the slit, wherein the rotary body is configured in such a way that, when a load exceeding a predetermined level and directed away from the base member is exerted on the rotary body, the fulcrum shaft moves in a direction in which the fulcrum shaft disengages from inside the bearing portion through the slit and, by the fulcrum shaft having moved pressing the restricting member from inside and the restricting member moving in a direction separating from the bearing portion, the fulcrum shaft disengages from the bearing portion.

In the shaft-support structure for a rotary body according to the one aspect of the present invention, since the fulcrum shaft disengages from the inside of the bearing portion when a load exceeding a predetermined level and directed away from the base member is exerted on the rotary body, it is possible to prevent or inhibit a portion, such as the fulcrum shaft, of the rotary body from being damaged.

In particular, in the shaft-support structure for a rotary body according to the one aspect of the present invention, since the rotary body is configured in such a way that the fulcrum shaft moves in a direction in which the fulcrum shaft disengages from the bearing portion through the slit and, by the fulcrum shaft having moved pressing the restricting member and the restricting member moving in a direction separating from the bearing portion, the fulcrum shaft disengages from the inside of the bearing portion, it is possible to provide a shaft-support portion fail-safe structure that is capable of more securely preventing or inhibiting a shaft-support component, such as the fulcrum shaft, of the rotary body from being damaged through cooperation between the slit disposed to the bearing portion and the restricting member disposed in such a way as to cover the slit.

In other words, the shaft-support structure for a rotary body according to the one aspect of the present invention enables the fulcrum shaft to be configured to easily disengage through the slit by reducing binding force by the slit by an amount that retaining force of the restricting member shoulders when compared with, for example, a shaft-support portion fail-safe structure disclosed in the PTL 1 described above that prevents a fulcrum shaft from disengaging only by a protrusion disposed on an end portion of a guide groove.

Therefore, it is possible to control variation in the amount of load causing the fulcrum shaft to disengage from the bearing portion through the slit to be comparatively small. Since binding force by the slit can be reduced to be comparatively small, it is possible to reduce force exerted on the slit and the fulcrum shaft on the occasion when the fulcrum shaft disengages from the bearing portion through the slit. Thus, the shaft-support structure for a rotary body according to the one aspect of the present invention excels as a shaft-support portion fail-safe structure that more securely prevents or inhibits a shaft-support component of a rotary body from being damaged. In addition, it is possible to manually place a rotary body that has disengaged back to a normal mounted state easily.

In the shaft-support structure for a rotary body according to the one aspect of the present invention, since the restricting member is disposed at a position facing the slit in such a way as to cover the slit and the slit of the shaft-support portion is thereby concealed, it is also possible to improve external appearance quality.

Further, in order to achieve the object mentioned above, according to another aspect of the present invention, there is provided a shaft-support structure for a rotary body, the shaft-support structure including: two bearing portions coaxially disposed to a base member; and two fulcrum shafts disposed on right and left side surfaces of the rotary body and respectively supported by the two bearing portions in a rotatable manner, the rotary body being rotated with respect to the base member about the two fulcrum shafts to a first position and a second position, the shaft-support structure including an elastically deformable restricting portion disposed to at least one bearing portion of the two bearing portions, wherein, when a load exceeding a predetermined level is exerted on the rotary body in a direction from the other bearing portion to the one bearing portion, the restricting portion is configured to elastically deform in such a way that the rotary body moves toward the one bearing portion and one of the two fulcrum shafts corresponding to the other bearing portion is configured to disengage from the other bearing portion.

In the shaft-support structure for a rotary body according to the another aspect of the present invention, since a fulcrum shaft corresponding to the other bearing portion disengages from the other bearing portion when a load exceeding a predetermined level is exerted on the rotary body from the other bearing portion side to the one bearing portion side, it is possible to prevent or inhibit a shaft-support component, such as the fulcrum shaft, of the rotary body from being damaged.

In particular, in the shaft-support structure for a rotary body according to the another aspect of the present invention, since the rotary body includes an elastically deformable restricting portion disposed to at least one bearing portion of the two bearing portions and, when a load exceeding a predetermined level is exerted on the rotary body from the other bearing portion side to the one bearing portion side, the restricting portion elastically deforms in such a way that the rotary body moves to the one bearing portion side and, therewith, a fulcrum shaft corresponding to the other bearing portion disengages from the other bearing portion, it is possible to provide a shaft-supporting portion fail-safe structure that is capable of, for a load exerted from a side of the rotary body, more securely preventing or inhibiting a shaft-support component, such as the fulcrum shaft, of the rotary body from being damaged through cooperation between the elastically deformable restricting portion disposed to the bearing portion and the fulcrum shaft that disengages from the bearing portion according to elastic deformation of the restricting portion.

In other words, the shaft-support structure for a rotary body according to the another aspect of the present invention enables the fulcrum shaft to be configured to easily disengage from the other bearing portion by reducing a retaining margin for the other bearing portion retaining the fulcrum shaft of the rotary body by an amount that the amount of axial movement of the restricting portion due to elastic deformation shoulders when compared with, for example, the shaft-support portion fail-safe structure disclosed in the PTL 1 described above that prevents a fulcrum shaft from disengaging only by a protrusion disposed on an end portion of a guide groove. In addition, it is possible to manually place a rotary body that has disengaged back to a normal mounted state easily.

Therefore, it is possible to control variation in the amount of load causing the fulcrum shaft to disengage from the inside of the other bearing portion to be comparatively small. In addition, effect of axial movement of the rotary body due to elastic deformation of the restricting portion enables binding force by the other bearing portion to be reduced to be comparatively small. Therefore, it is possible to reduce a load exerted on the other bearing portion and the fulcrum shaft on the occasion when the fulcrum shaft disengages from the inside of the other bearing portion. Thus, the shaft-support structure for a rotary body according to the another aspect of the present invention excels as a shaft-support portion fail-safe structure that more securely prevents or inhibits a shaft-support component of a rotary body from being damaged.

Advantageous Effects of Invention

As described above, the present invention can more securely prevent or inhibit a shaft-support component of a rotary body from being damaged when a load exceeding a predetermined level is exerted on the rotary body.

BRIEF DESCRIPTION OF DRAWINGS

FIGS. 1A and 1B illustrate a use attitude in which a table main body is opened and the folding table in FIG. 1A viewed from the rear surface side, respectively;

FIG. 2A illustrates a state in which a cover body at the center of a base panel is removed and FIG. 2B is an enlarged view of a portion A in FIG. 2A;

FIGS. 5A and 5B are a cross-sectional view taken along the line Z-Z in FIG. 3B and a cross-sectional view taken along the line Y-Y in FIG. 3B, respectively;

FIG. 6A is a plan view of the cup holder at a use position illustrated with a main portion cross-sectioned and FIG. 6B is an enlarged view of a portion B in FIG. 6A;

FIGS. 9A and 9B illustrate a fail-safe state when a load is exerted from the left side (outer side) and a fail-safe state when a load is exerted from the right side (inner side), respectively;

FIGS. 10A, 10B, and 10C illustrate a fail-safe state when a load is exerted from the left side (outer side), the fail-safe state with the cover body at the center removed, and an enlarged view of a portion C in FIG. 10B, respectively; FIGS. 11A, 11B, and 11C illustrate a fail-safe state when a load is exerted from the right side (inner side), the fail-safe state with the cover body at the center removed, and an enlarged view of a portion D in FIG. 11B, respectively.

DESCRIPTION OF EMBODIMENTS

Hereinafter, an embodiment of the present invention will be described with reference to the drawings as appropriate. A shaft-support structure for a rotary body of the present embodiment is an example of a shaft-support structure for a rotary body that is applied to a fulcrum shaft portion of a cup holder disposed to a folding table mounted on the back surface of the backrest of a seat for a vehicle.

Note that the drawings are schematic. Therefore, it should be noted that a relation and ratio between thickness and planar dimensions, and the like are different from actual ones, and portions where dimensional relations and ratios are different from one another among the drawings are also included. In addition, the embodiment, which will be described below, indicates a device and method to embody a technical idea of the present invention, and the technical idea of the present invention does not limit materials, shapes, structures, arrangements, and the like of the constituent components to those described in the embodiment below.

Figure 1A:
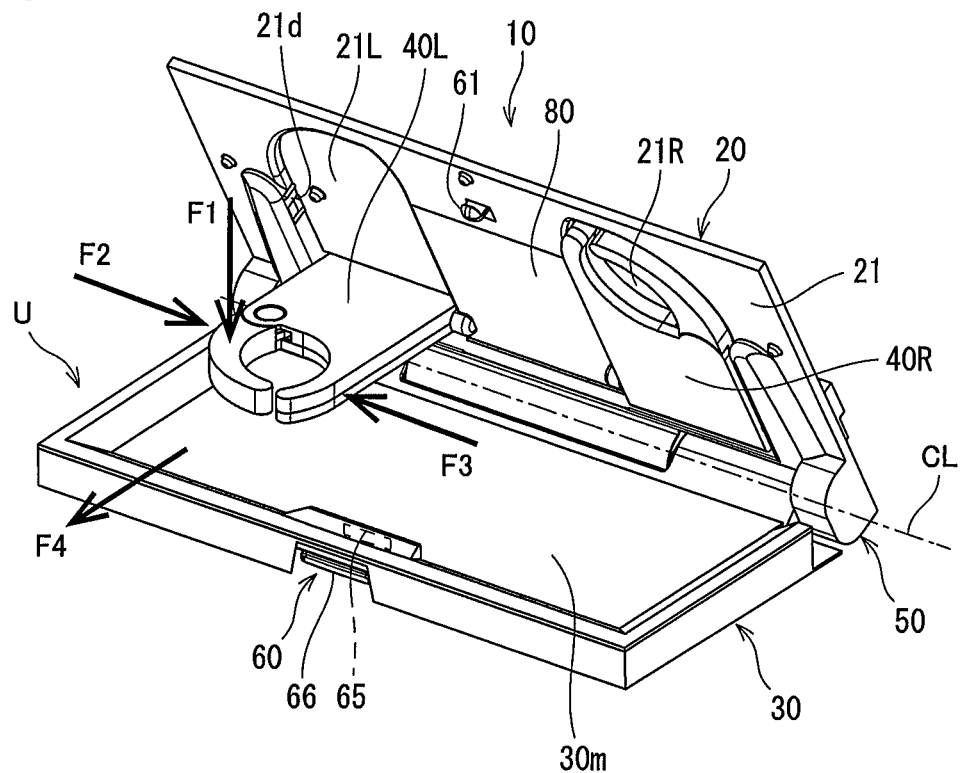
FIGS. 1A and 1B are perspective views descriptive of an embodiment of a folding table including a shaft-support structure for a rotary body according to one aspect of the present invention.
Figure 1B:
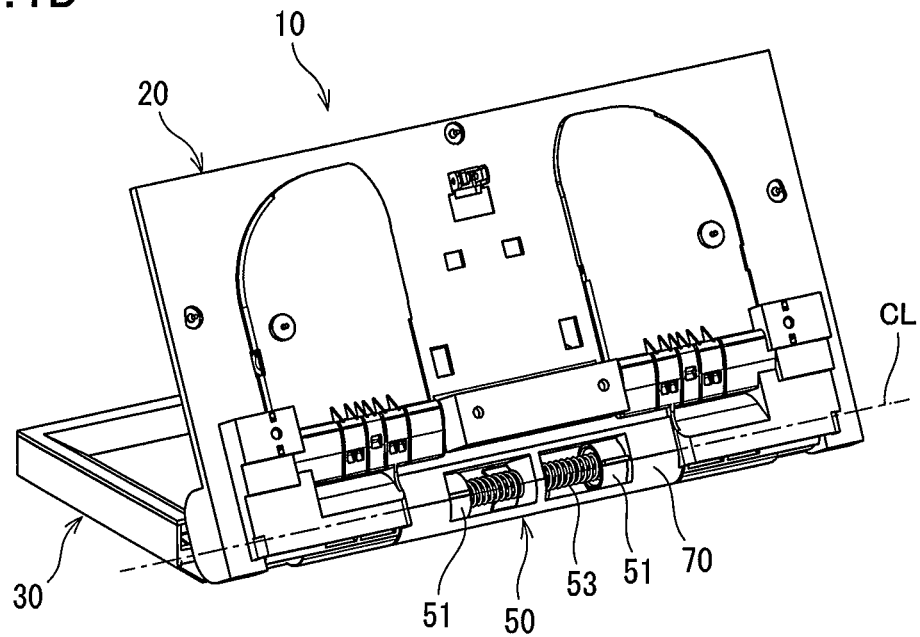

As illustrated in FIGS. 1A and 1B, a folding table 10 of the present embodiment includes a base panel 20 and a table main body 30. The base panel 20 is a member that is made of plastic and is formed in a substantially rectangular shape in a plan view. On the rear surface of the base panel 20, a reinforcing rib and a locking portion for holding the base panel 20 to a backrest are formed at appropriate places (see FIG. 1B). On a lower portion of the base panel 20, a hinge mechanism 50 that has a fulcrum axis CL extending horizontally in the vehicle width direction is disposed.

On the back surface of a not-illustrated backrest, a backrest finisher that is made of, for example, plastic is mounted, and the base panel 20 has appropriate portions thereof fixed to the backrest finisher by fixing members, such as bolts and clamps, in such a way as to cover a recessed portion on an upper portion side of the backrest finisher.

The table main body 30 is a member that is made of plastic and is formed in a substantially similar shape to the external shape of the base panel 20 in a plan view. The table main body 30 has a base end portion thereof rotatably supported about the fulcrum axis CL at a lower end portion of the base panel 20 and is rotatable from a use attitude U (FIG. 1A) in which the table main body 30 is opened to a housed attitude (not illustrated) in which the table main body 30 is closed to the side where the base panel 20 is located.

In the present embodiment, in the use attitude U, the table main body 30 is deployed to a position at which a table mounting-surface 30m is substantially horizontal, as illustrated in FIG. 1A.

Although the table main body 30 is set to have the table mounting-surface 30m positioned substantially horizontal in the use attitude U when the backrest of the seat for the vehicle is in a state of being arranged to a regular stand-up position, at which the backrest slightly inclines backward, a backrest generally has its inclination attitude adjustable by means of a reclining mechanism, as a result of which a horizontal state of the table main body 30 in the use attitude U varies according to a reclining angle.

When the table main body 30 is in the housed attitude, in which the table main body 30 is closed to the side where the base panel 20 is located, the base panel 20 and the table main body 30 are hooked to each other by a hook unit 60, which has an engagement structure that is disposed on both members, as a result of which the housed attitude is retained. In the present embodiment, the hook unit 60, as an engagement structure disposed on both members described above, includes a hook 61 that is disposed at the middle of an upper edge portion of the base panel 20 and an engagement hole 65 that is disposed at the middle of an upper edge portion of the table main body 30, as illustrated in FIG. 1A. On the table main body 30, a push button 66 on which a passenger manually performs a push-down operation to release engagement of the hook 61 is disposed.

When the table main body 30 is in the housed attitude, the hook unit 60 is able to retain the table main body 30 in a state in which rotational motion thereof is restricted by elastically hooking the hook 61 to the engagement hole 65. The hook unit 60 is configured to be able to, when the passenger pushes down the push button 66, push down the hook 61 and releases the hook 61 from a state of being hooked to the engagement hole 65 and consequently release the engagement in the hook unit 60.

Further, in the present embodiment, the table main body 30 is supported by the hinge mechanism 50, which connects the table main body 30 to the base panel 20, in a manner enabling the table main body 30 to be rotated and to be retained and released in and from a plurality of attitudes with respect to the base panel 20.

The hinge mechanism 50, as a back surface portion thereof is illustrated in FIG. 1B, includes two pairs of cam bodies 51 and a coil spring 53 as constituent members. The two pairs of cam bodies 51 are arranged in an opposite manner to each other at horizontally symmetrical positions on both sides in the axial direction in a state of being biased to the outsides in the axial direction by the coil spring 53 arranged at the middle. The constituent members of the hinge mechanism 50 are built into a hinge case 70, the constituent components of which are respectively formed in one body with the base panel 20 and the table main body 30, from the back surface side of the hinge case 70.

The hinge mechanism 50 is configured in such a way that, when the passenger manually rotates the table main body 30 relatively to the base panel 20, each pair of cam bodies 51 rotate relatively to each other to a predetermined angle by a biasing force of the coil spring 53 and a camming action between the pair of cam bodies 51. Further, the hinge mechanism 50 is configured in such a way that, at a position corresponding to the predetermined angle, concavo-convex shapes formed on cam surfaces of both cam bodies 51 come into a predetermined state of engagement with each other and the table main body 30 can thereby be retained in an attitude in which the table main body 30 rotates relatively to the base panel 20 by the predetermined angle.

Further, the folding table 10 has two foldable cup holders 40L and 40R disposed on a front surface 21 of the base panel 20 in a horizontally symmetrical manner, as illustrated in FIG. 1A. Between the two cup holders 40L and 40R, a center cover 80 that is a covering body is mounted in an attachable and detachable manner.

Figure 2A:
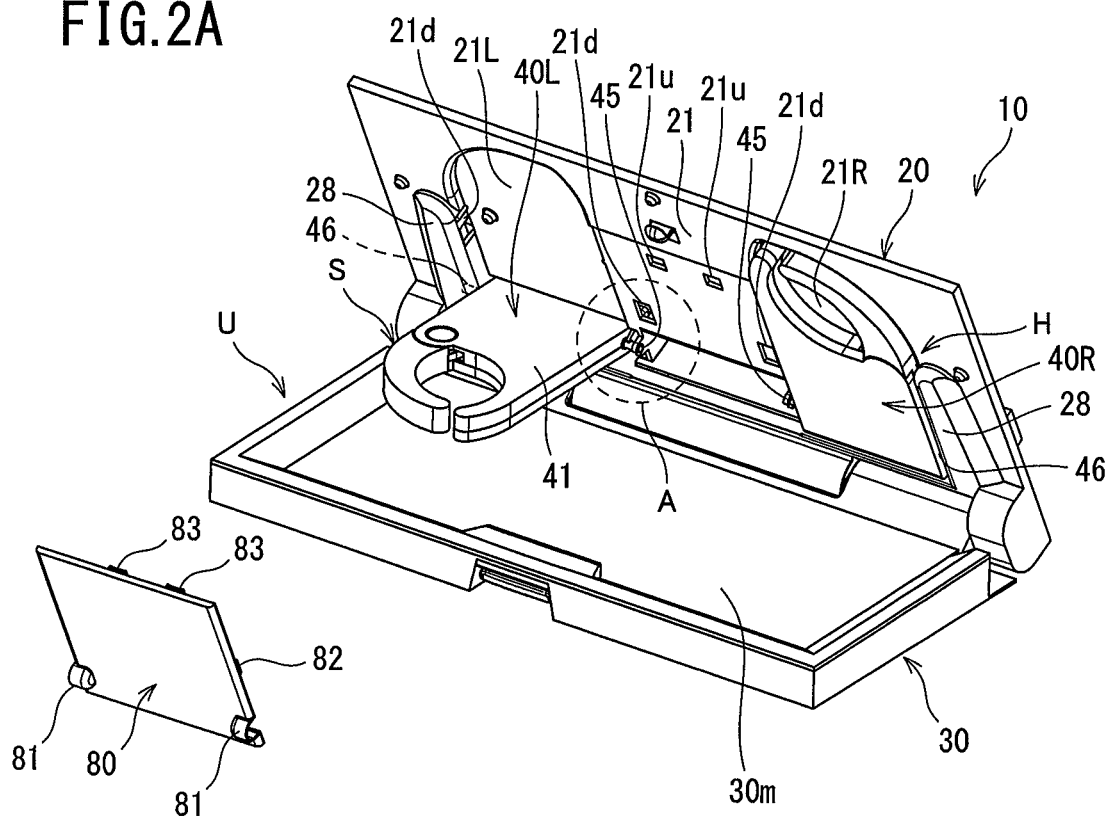
FIGS. 2A and 2B are perspective views descriptive of a shaft-support structure of a cup holder of the folding table illustrated in FIG. 1A.
Figure 2B:
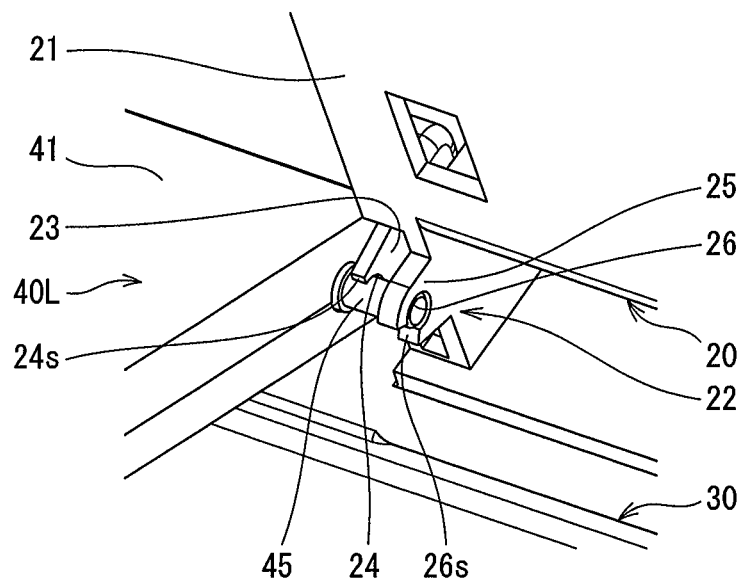

Each of the cup holders 40L and 40R has fulcrum shafts 45 and 46 disposed coaxially at the right and left ends of a base end portion thereof, as illustrated in FIGS. 2A and 2B. The center cover 80 is mounted in such a way as to cover a portion including the inner side fulcrum shafts 45 disposed on the middle sides between the respective cup holders 40L and 40R, which causes a central portion of the base panel 20 to be kept in a good external appearance.

Each of the cup holders 40L and 40R is supported by the base panel 20 in a rotatable manner about the right and left fulcrum shafts 45 and 46. This configuration enables each of the cup holders 40L and 40R to, with respect to the base panel 20, individually rotate about an axis CLh (see FIG. 3A) of the right and left fulcrum shafts 45 and 46 to a housed position H that is a first position and at which the cup holder is folded and a use position S that is a second position and at which the cup holder is deployed.

On the front surface 21 of the base panel 20, recessed portions 21L and 21R for housing the left and right cup holders 40L and 40R at the time of folding of the cup holders 40L and 40R are formed in substantially similar shapes. The respective cup holders 40L and 40R are mounted in such a manner as to be able to be housed in the left and right recessed portions 21L and 21R when being at the housed position H. This configuration enables a compact housing when the cup holders 40L and 40R are in a folded state.

Figure 3A:
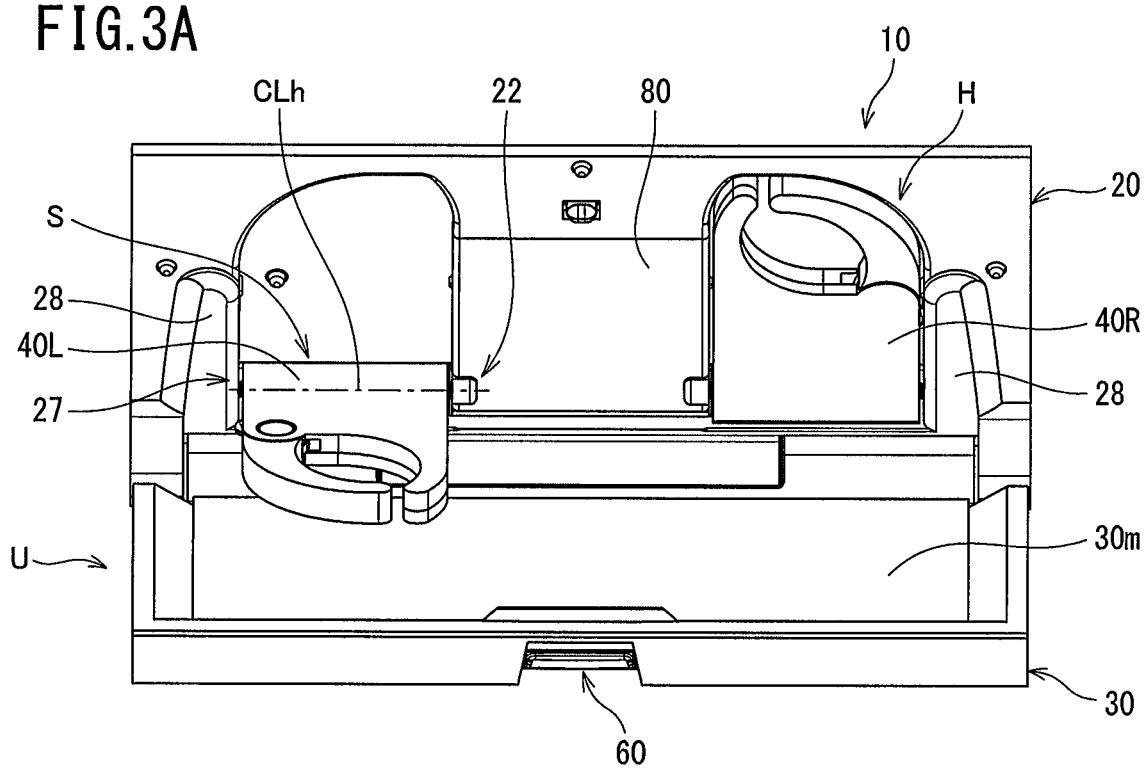
FIGS. 3A and 3B are explanatory diagrams of the folding table illustrated in FIG. 1A, and FIGS. 3A and 3B are a diagram of the folding table viewed from a front and slightly obliquely upper direction and a front view thereof, respectively.
Figure 3B:
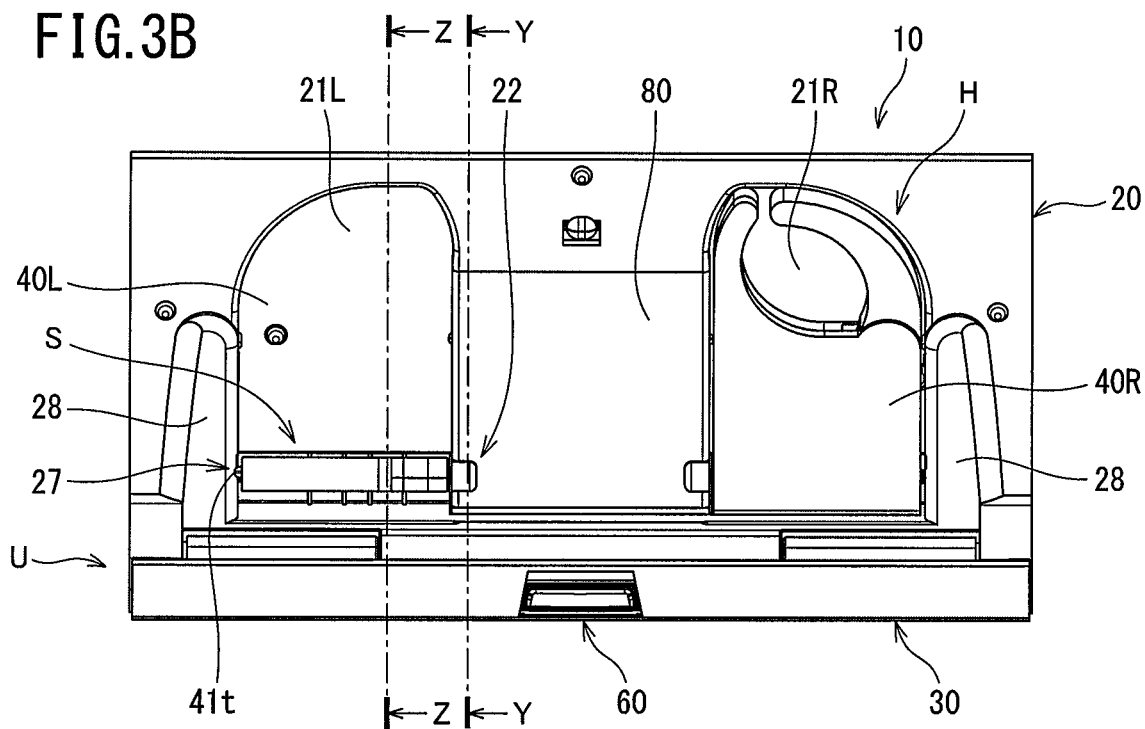

Each of the cup holders 40L and 40R, when the table main body 30 is in the use attitude U, is rotated about the axis CLh of the fulcrum shafts 45 and 46 to the use position S at which the cup holder is substantially parallel with the table mounting-surface 30m of the table main body 30, as illustrated in FIGS. 2A, 3A, and 3B, and serves a role of supporting a cup or similar article, such as a paper cup, a canned juice, and a beverage container.

The left and right cup holders 40L and 40R have the same configuration except being formed in a horizontally symmetrical manner. For this reason, hereinafter, the left cup holder 40L will be described and an illustration and a description of a detailed structure of the right cup holder 40R will be omitted.

Figure 4:
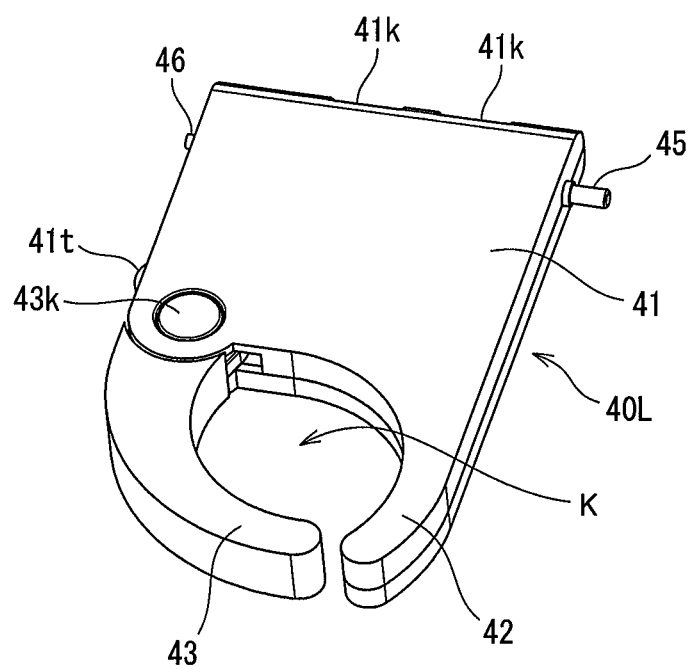
FIG. 4 is a perspective view illustrative of a cup holder in a state of being removed from the base panel.

As illustrated in FIG. 4, the cup holder 40L includes a holder main body 41 that includes a fixed arm 42 and has a flat shape and a rotary arm 43 a base end portion of which is supported in a horizontally rotatable manner with respect to the holder main body 41 and that has a hook shape. The rotary arm 43 is arranged facing the fixed arm 42 with a predetermined space allowing a cup or similar article to be supported interposed therebetween, and a portion in the predetermined space serves as a cup insertion portion K. The rotary arm 43 is biased toward the side where the fixed arm 42 is located by a not-illustrated spring built-in in a base end portion 43k.

The rotary arm 43 of the cup holder 40L, at the use position S, horizontally rotated according to size of a cup or similar article that is inserted into the cup insertion portion K from above. Thus, the cup holder 40L enables, upon insertion of a cup or similar article into the cup insertion portion K, the cup or similar article, which has a different size, shape, and the like, to be held in the cup insertion portion K in a favorable manner.

On the left side surface, which faces the outer side, of the holder main body 41, an engaging protrusion 41t is disposed that elastically deforms in an advanceable and retractable manner in the width direction of the holder main body 41. On the other hand, on the base panel 20, an engaging recessed portion 21d that is capable of engaging and disengaging with and from the engaging protrusion 41t is formed at a position that is on the inner side surface of the recessed portion 21L into which the cup holder 40L is housed and that faces the engaging protrusion 41t when the cup holder 40L is at the housed position H, as illustrated in FIG. 2A.

This configuration causes the engaging protrusion 41t of the cup holder 40L and the engaging recessed portion 21d of the base panel 20 to engage with each other at the housed position H and thereby enables the cup holder 40L to be retained at the housed position H. This configuration also enables a passenger to, by holding appropriate portions of the cup holder 40L placed at the housed position H and pulling out the cup holder 40L toward himself/herself against a retaining force produced by elastic deformation of the engaging protrusion 41t, rotate the cup holder 40L to the use position S.

Figure 5A:
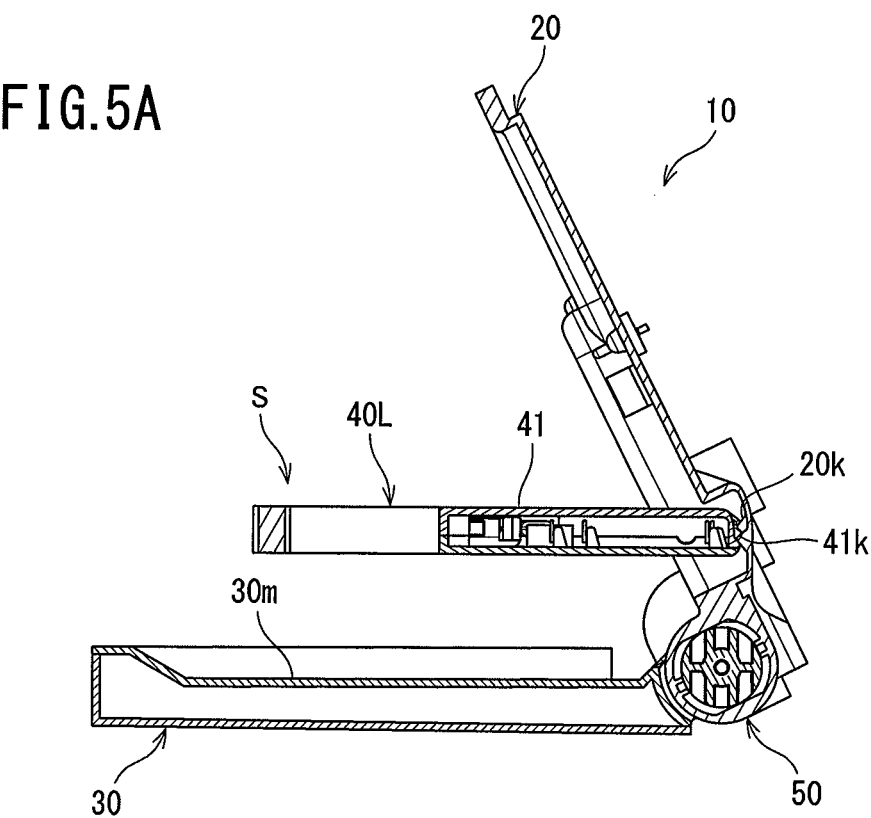
FIGS. 5A and 5B are diagrams descriptive of a shaft-support portion fail-safe structure of the cup holder.

Further, as illustrated in FIG. 4, on the cup holder 40L, use position retaining nails 41k that are disposed in a protruding manner toward the side where the base panel 20 is located are formed at two positions horizontally separated from each other on a substantially middle portion of the back end surface of a base end portion of the holder main body 41. On the other hand, on the base panel 20, use position retaining nails 20k are formed on a lower portion of the inner side surface of the recessed portion 21L into which the cup holder 40L is housed, as a cross section is illustrated in FIG. 5A.

The use position retaining nails 20k are formed at two positions that are horizontally separated from each other and face the use position retaining nails 41k when the cup holder 40L is at the use position S described above. The use position retaining nails 20k elastically deform according to a rotational position of the cup holder 40L in an engageable and disengageable manner with and from the use position retaining nails 41k in a direction in which both use position retaining nails face each other.

This configuration causes the use position retaining nails 41k of the cup holder 40L and the use position retaining nails 20k of the base panel 20 to engage with each other at the use position S and thereby enables the cup holder 40L to be retained at the use position S. This configuration also enables the passenger to, by holding appropriate portions of the cup holder 40L placed at the use position S and rotating the cup holder 40L toward the housed position side against a retaining force produced by elastic deformation of the use position retaining nails 41k, house the cup holder 40L to the housed position H.

In the present embodiment, each of the cup holders 40L and 40R has, in a shaft-support structure of the cup holder, a "shaft-support portion fail-safe structure" disposed for preventing or inhibiting shaft-support components from being damaged when a load (moment) exceeding a predetermined level is exerted on the cup holder. Hereinafter, the shaft-support portion fail-safe structure will be described in detail. As described above, in the following description, the cup holder 40L will be illustrated and described and an illustration and a description of the cup holder 40R will be omitted.

Figure 6A:
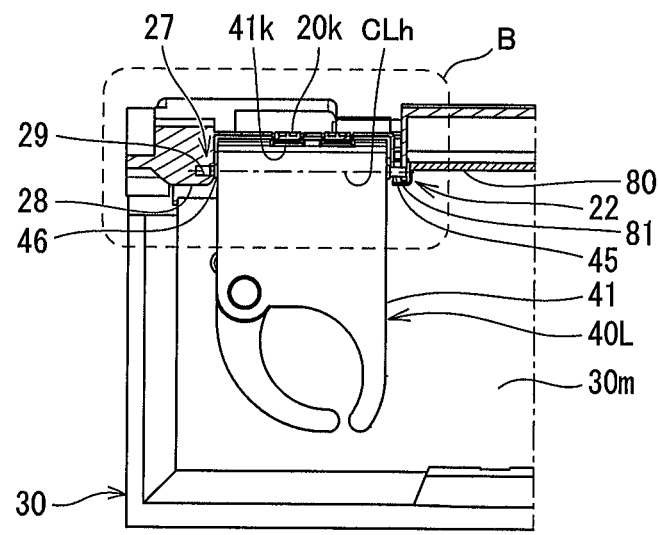
FIGS. 6A and 6B are diagrams descriptive of the shaft-support portion fail-safe structure of the cup holder.
Figure 6B:
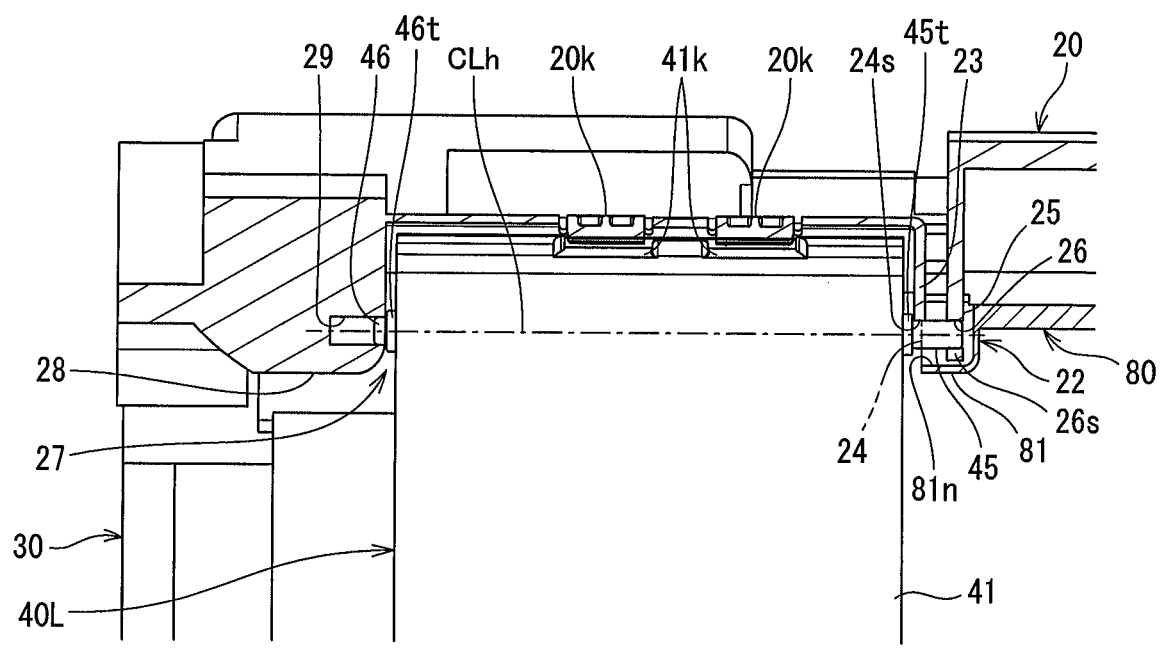

As illustrated in FIGS. 6A and 6B, the cup holder 40L includes, as the two fulcrum shafts 45 and 46 described above, an outer side fulcrum shaft 46 disposed on the left side surface of the holder main body 41 and an inner side fulcrum shaft 45 disposed on the right side surface of the holder main body 41. On the other hand, the base panel 20 has two bearing portions 22 and 27 disposed coaxially with the axis CLh of the two fulcrum shafts 45 and 46. The inner side fulcrum shaft 45 and the outer side fulcrum shaft 46 are pivotally supported by the inner side bearing portion 22 on the axially inner side and the outer side bearing portion 27 on the axially outer side, respectively, in a rotatable manner.

As illustrated in an enlarged manner in FIG. 6B, on the front surface 21 of the base panel, a bulging portion 28 bulging to the side where the table main body 30 is located is formed at a position facing the outer side surface of the holder main body 41, and, on the inner side surface of the bulging portion 28, a supporting hole 29 that supports the outer side fulcrum shaft 46 in a freely rotatable manner is formed and forms the outer side bearing portion 27. To a base end portion of the outer side fulcrum shaft 46 and a base end portion of the inner side fulcrum shaft 45, an annular boss portion 46*t* and an annular boss portion 45*t* are disposed on the left side surface of the holder main body 41 and the right side surface of the holder main body 41, respectively.

The outer side fulcrum shaft 46 corresponding to the outer side bearing portion 27 has a shorter length than the inner side fulcrum shaft 45 corresponding to the inner side bearing portion 22, and the outer side fulcrum shaft 46 is inserted into the inside of the supporting hole 29 down to a vicinity of the opening portion of the supporting hole 29 (to a midway portion of the supporting hole 29). This configuration enables the outer side fulcrum shaft 46 to, when a load exceeding a predetermined level is exerted from the left side surface side (see F2 in FIGS. 1A and 1B), easily engage and disengage with and from the supporting hole 29 through cooperation with the inner side bearing portion 22. As the load exceeding a predetermined level, for example, a load of approximately 24.5 N to 49 N is assumed.

On the other hand, the inner side bearing portion 22 is configured including a pair of supporting arms 23 and 25 that support the inner side fulcrum shaft 45 in a rotatable manner, as illustrated in FIGS. 2B and 6B. Each of the pair of supporting arms 23 and 25 projects from a lower portion of the front surface 21 of the base panel 20 in the direction perpendicular to the front surface 21 in a cantilever state. Of the pair of supporting arms 23 and 25, the first supporting arm 23 and the second supporting arm 25 are disposed on the axially outer side (the side where the holder main body 41 is located) and the axially inner side (the opposite side to the holder main body 41), respectively.

On a tip end portion of the first supporting arm 23, a first bearing surface 24 that supports a base end side of the inner side fulcrum shaft 45 is disposed, and, on a tip end portion of the second supporting arm 25, a second bearing surface 26 that supports a tip end side of the inner side fulcrum shaft 45 is disposed coaxially with and in the same diameter as the first bearing surface 24. The first supporting arm 23 is formed in such a way as to have thickness (axial dimension) thinner than thickness (axial dimension) of the second supporting arm 25. This configuration enables the first supporting arm 23 to, when a load exceeding a predetermined level is exerted from the left side surface side (see F2 in FIGS. 1A and 13), elastically deform in the axial direction more easily than the second supporting arm 25.

Further, the pair of supporting arms 23 and 25 have slits 24*s* and 26*s* formed, respectively. The slits 24*s* and 26*s*, on the side apart from the base panel 20, open portions of the peripheral portions of the respective bearing surfaces 24 and 26 along the axial direction and in the obliquely downward direction. This configuration causes the respective bearing surfaces 24 and 26 to have opening portions formed in the obliquely downward direction toward the side where the table mounting-surface 30*m* is located.

Since opening widths (dimensions in a direction perpendicular to the axial direction) of the respective slits 24*s* and 26*s* are narrower than diameter of the inner side fulcrum shaft 45, the inner side fulcrum shaft 45 is supported in the respective bearing surfaces 24 and 26 and does not disengage through the slits 24*s* and 26*s* in a general use condition. However, when a load exceeding a predetermined level and directed away from the base panel 20 is exerted, pressing by the inner side fulcrum shaft 45 causes the pair of supporting arms 23 and 25 to elastically deform and the opening widths of the slits 24*s* and 26*s* to widen, which enables the inner side fulcrum shaft 45 to move in a direction in which the inner side fulcrum shaft 45 disengages from the respective bearing surfaces 24 and 26 through the slits 24*s* and 26*s*.

As illustrated in FIGS. 2B and 6B, a forming position (dimension in the direction perpendicular to the axial direction) of the first slit 24*s* of the first supporting arm 23 is set at a position at which the dimension thereof in the direction perpendicular to the axial direction is shorter than a forming position (dimension in the direction perpendicular to the axial direction) of the second slit 26*s* of the second supporting arm 25. This setting causes the opening width of the first bearing surface 24 by the first slit 24*s* to be wider than the opening width of the second bearing surface 26 by the second slit 26*s*.

This configuration causes the inner side fulcrum shaft 45 to more easily disengage through the slit 24*s* of the first bearing surface 24 of the first supporting arm 23 than from the second bearing surface 26 of the second supporting arm 25 in any of a case in which a load exceeding a predetermined level is exerted from above (see F1 in FIGS. 1A and 1B), a case in which a load exceeding a predetermined level is exerted from the left side surface side (see F2 in FIGS. 1A and 1B), and a case in which a load exceeding a predetermined level is exerted backward (see F4 in FIGS. 1A and 1B).

Figure 7:
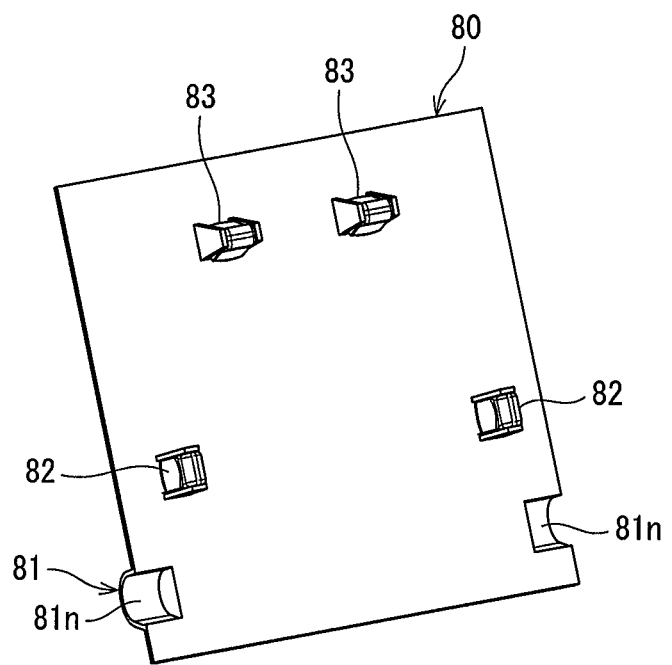
FIG. 7 is a perspective view of the cover body in a state of being removed from the base panel when viewed from the rear surface side.

Further, the center cover 80 described above, as a main portion thereof is illustrated in FIG. 6B, is mounted in such a way as to cover the whole of the inner side bearing portion 22 from the front side. On the rear surface of the center cover 80, engaging hooks 82 and 83, each of which is a spring member shaped in substantially a letter Ω and made of resin, are disposed at four positions on upper and lower portions, as illustrated in FIG. 7. The respective engaging hooks 82 and 83 are engaged with engaging holes 21*u* and 21*d*, illustrated in FIG. 2A, that are formed at positions on the front surface 21 of the base panel 20 that face the engaging hooks 82 and 83, in an attachable and detachable manner.

The two lower engaging hooks 82 are disposed in upper vicinities of bulging portions 81, and the two upper engaging hooks 83 are disposed in a vicinity of an upper edge portion of the center cover 80. Separation distance between the two lower engaging hooks 82 is set to be larger than separation distance between the two upper engaging hooks 83. The upper engaging hooks 83 are arranged in such a way that an elastic displacement direction of the resin springs is aligned with the vertical direction, and the lower engaging hooks 82 are arranged in such a way that an elastic displacement direction of the resin springs is aligned with the horizontal direction.

Because of this configuration, the center cover 80 is configured in such a way that the two lower engaging hooks 82 more easily disengage from the engaging holes 21d of the base panel 20 than the two upper engaging hooks 83. Retaining force by each lower engaging hook 82 of the center cover 80 is set in such a way that a pressing force corresponding to a load F3 as a load exceeding a predetermined level causes the engaging hook 82 to disengage from the corresponding engaging hole 21d.

The center cover 80 has, on right and left lower portions thereof, the bulging portions 81 that are formed in such a manner as to bulge to the near side in the mounting direction. Each bulging portion 81 is disposed at a portion that covers the inner side bearing portion 22 when being mounted to the base panel 20. On the rear surface of each bulging portion 81, an inner peripheral surface 81n shaped in a concave circular arc is formed. The center cover 80 is mounted on the base panel 20 in such a way that the inner peripheral surface 81n of each bulging portion 81 faces an end portion of the slit 26s of the pair of supporting arms 23 and 25 with a slight gap interposed therebetween, as illustrated in FIG. 6B.

Because of the configuration described thus far, when a load exceeding a predetermined level and directed away from the base panel 20 (see F1 to F4 in FIGS. 1A and 1B) is exerted on the cup holder 40L, the inner side fulcrum shaft 45 moves in a direction in which the inner side fulcrum shaft 45 disengages from the inside of the inner side bearing portion 22 through the slits 24s and 26s.

Further, the inner side fulcrum shaft 45 having moved is configured to press the inner peripheral surface 81n of the bulging portion 81 of the center cover 80 from the inner side and move the center cover 80 in a direction separating from the inner side bearing portion 22. The center cover 80 moving in the direction separating from the inner side bearing portion 22 because of the above configuration causes the inner side fulcrum shaft 45 to disengage from the inner side bearing portion 22.

Next, operation and operational effects of the folding table 10 described above will be described.

Since the folding table 10 of the present embodiment includes the hook unit 60 described above and the hinge mechanism 50 including cam bodies 51, a passenger is able to, by releasing the table main body 30 from retention by the hook unit 60 and hooking his/her fingers on a peripheral portion and the like of the table main body 30 and rotating the table main body 30 backward from the backrest, rotate the table main body 30 to a position at which the table main body 30 becomes substantially horizontal and thereby bring the table main body 30 to the use attitude U illustrated in FIG. 1A.

In addition, since manually rotating the table main body 30 forward from the use attitude U and thereby bringing the table main body 30 back to the housed attitude in which the table main body 30 is closed to the backrest side cause the table main body 30 to be hooked to the base panel 20 by the hook unit 60, the passenger is able to close the table main body 30.

In other words, according to the folding table 10, since only a passenger's rotating the table main body 30 manually in the closing direction or the opening direction by a predetermined angle causes the table main body 30 to subsequently rotate automatically by a biasing force of the coil spring 53 that the hinge mechanism 50 includes and a camming action of the two pairs of cam bodies 51, it is possible to easily perform opening and closing operation of the table main body 30. In addition, the state of the use attitude U, in which the table main body 30 is opened, can be retained automatically without backlash by a biasing force of the coil spring 53 and a camming action of the two pairs of cam bodies 51.

Since the folding table 10 includes two foldable cup holders 40L and 40R on the front surface 21 of the base panel 20, the passenger, by manually rotating one of the cup holders 40L and 40R to the use position S when the table main body 30 is in the use attitude U, can support a cup or similar article in the cup insertion portion K favorably.

In particular, since the folding table 10 of the present embodiment includes a "shaft-support portion fail-safe structure" in the shaft-support structures of the respective cup holders 40L and 40R, it is possible to make the fulcrum shafts 45 and 46 disengage from the bearing portions 22 and 27 when loads F1 to F4 exceeding a predetermined level and directed away from the base panel 20 are exerted on the left and right fulcrum shafts 45 and 46. Thus, it is possible to prevent or inhibit shaft-support components, such as the fulcrum shafts 45 and 46, of each of the cup holders 40L and 40R from being damaged.

That is, the shaft-support structure of each of the cup holders 40L and 40R disposed to the folding table 10 enables shaft-support components, such as the fulcrum shafts 45 and 46, of each of the cup holders 40L and 40R to be more securely prevented or inhibited from being damaged according to loads F1 to F4 exerted from a plurality of directions as illustrated in FIG. 1A. In addition, it is possible to manually place each of the cup holders 40L and 40R that has disengaged back to a normal mounted state easily.

Figure 9A:
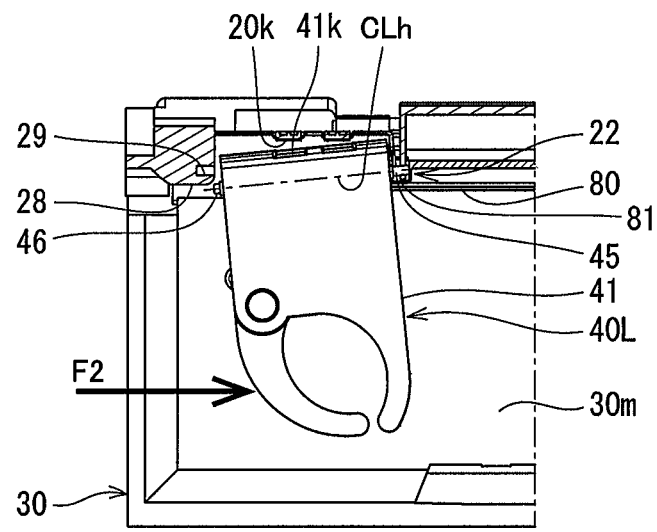
FIGS. 9A and 9B are diagrams descriptive of an operation when the fail-safe structure of the fulcrum shaft portion of the cup holder has worked.
Figure 10A:
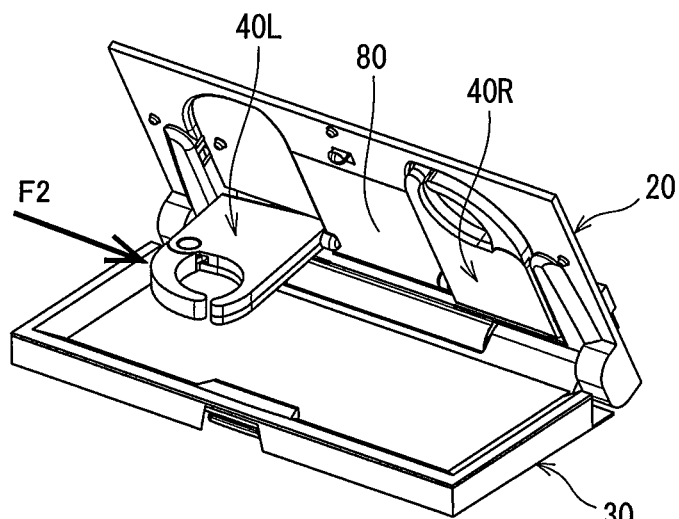
FIGS. 10A to 10C are perspective views descriptive of an operation when the fail-safe structure of the fulcrum shaft portion of the cup holder has worked.
Figure 10B:
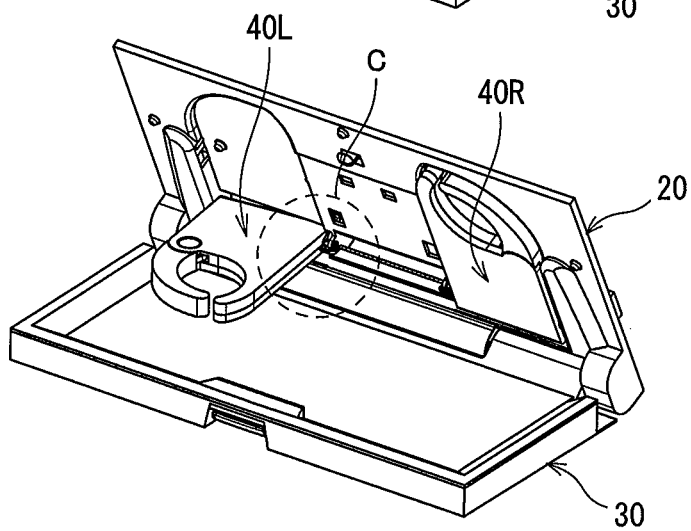
Figure 10C:
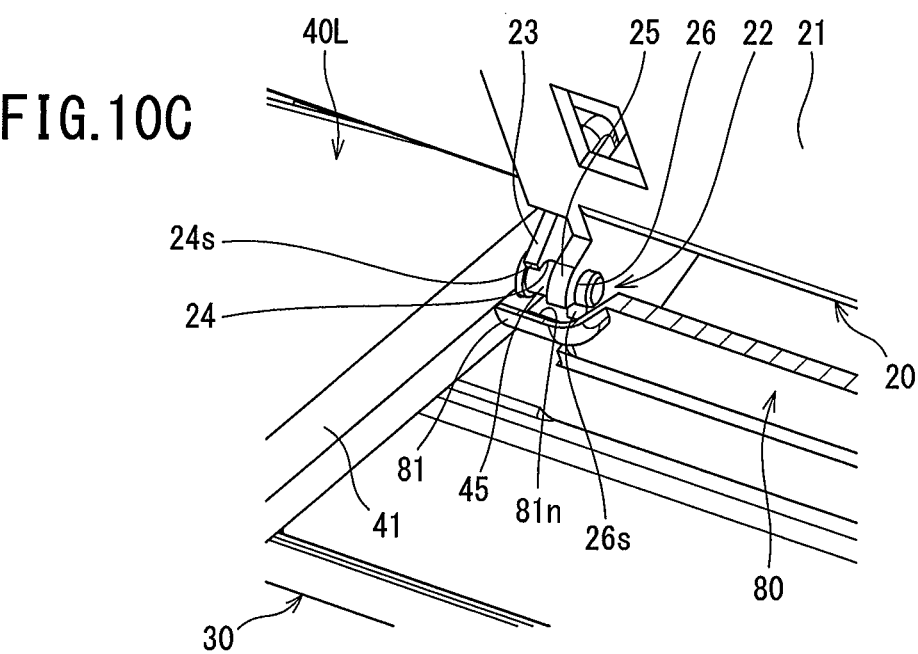

Specifically, according to the shaft-support structure of each of the cup holders 40L and 40R disposed to the folding table 10, for a load F2 exerted from the outer side in the lateral direction on the cup holder 40L, the first supporting arm 23, which is disposed in conjunction with the second supporting arm 25, is pushed by the holder main body 41, as illustrated in FIGS. 10A to 10C. This pushing causes the first supporting arm 23 to elastically deform to the inner side and bend, and this bending causes the cup holder 40L to move to the side where the inner side bearing portion 22 is located, as illustrated in FIG. 10C. Since, as illustrated in FIG. 9A, this movement causes the short outer side fulcrum shaft 46, which fits into the supporting hole 29 of the outer side bearing portion 27, to disengage from the supporting hole 29, it is possible to prevent the shaft-support components, such as the fulcrum shafts 45 and 46, of the cup holder 40L from being damaged. Since adjustment of length of the outer side fulcrum shaft 46 enables timing at which the outer side fulcrum shaft 46 disengages from the supporting hole 29 to be changed easily, it is possible to easily perform adjustment of the amount of load causing the outer side fulcrum shaft 46 to disengage. Since adjustment of the amount of elastic deformation is easily performed through adjustment of thickness or the like of the first supporting arm 23, it is also possible to easily perform adjustment of the amount of load causing the outer side fulcrum shaft 46 to disengage through adjustment of the amount of bending of the first supporting arm 23.

Figure 11A:
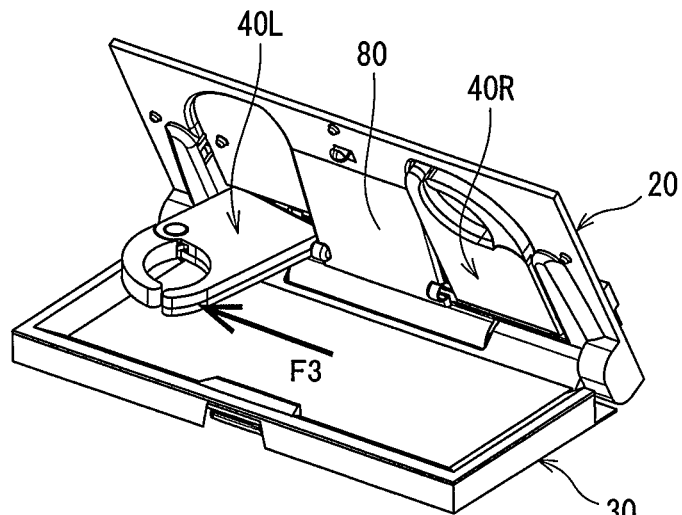
FIGS. 11A to 11C are perspective views descriptive of an operation when the fail-safe structure of the fulcrum shaft portion of the cup holder has worked.
Figure 11B:
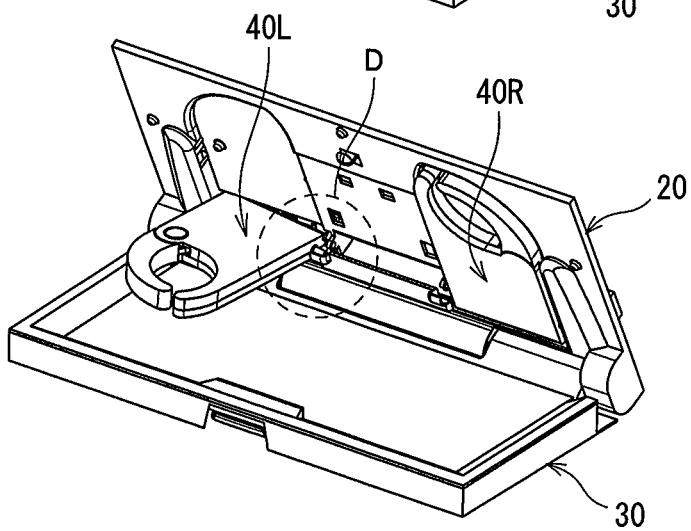
Figure 11C:
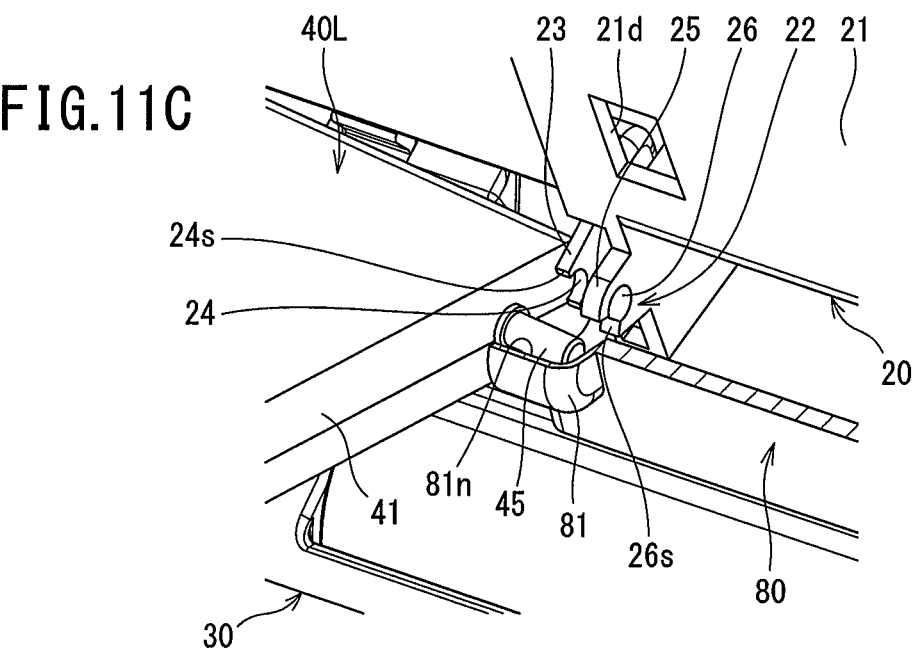

Further, according to the shaft-support structure of each of the cup holders 40L and 40R disposed to the folding table 10, for a load F3 exerted from the inner side in the lateral direction on the cup holder 40L, the cup holder 40L is allowed to move in the rotational direction with the outer side fulcrum shaft 46 serving as a fulcrum due to effect of the short outer side fulcrum shaft 46, which fits into the supporting hole 29 of the outer side bearing portion 27, as illustrated in FIGS. 11A to 11C.

Therefore, the inner side fulcrum shaft 45 of the cup holder 40L disengages through the slits 24s and 26s, and, next, the inner side fulcrum shaft 45 comes into contact with the center cover 80, which covers the bearing portion 22 supporting the inner side fulcrum shaft 45, from the inside of the center cover 80, as illustrated in FIG. 11C. Since retaining force by the lower engaging hook 82 of the center cover 80 is set in such a way that the engaging hook 82 disengages from the engaging hole 21d by a pressing force corresponding to a load F3, the lower engaging hook 82 on a lower portion of the center cover 80 disengages from the engaging hole 21d.

Figure 9B:
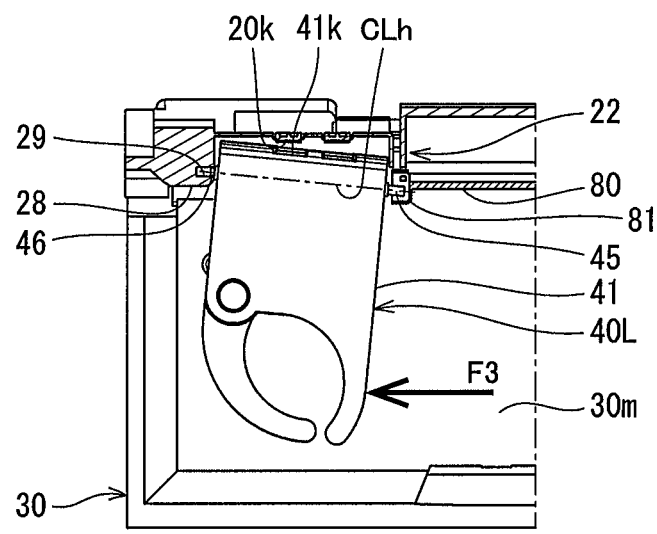

This disengagement causes the inner side fulcrum shaft 45 to disengage from the bearing portion 22, as illustrated in FIG. 9B, which enables the shaft-support components, such as the fulcrum shafts 45 and 46, of the cup holder 40L to be prevented from being damaged. Since adjustment of engagement force (for example, adjustment of engagement shapes, the amount of engagement, the amount of elastic deformation, and the like of a nail) of the lower engaging hook 82 disposed on a lower portion of the center cover 80 illustrated in FIG. 7 enables timing at which the inner side fulcrum shaft 45 disengages from the bearing portion 22 to be changed easily, it is possible to easily perform adjustment of the amount of load causing the inner side fulcrum shaft 45 to disengage.

Since, for a load F3 exerted from the inner side in the lateral direction on the cup holder 40L, the center cover 80, by means of retaining force by the lower engaging hook 82 thereof, inhibits the inner side fulcrum shaft 45 from finally disengaging from the bearing portion 22, it is possible to, by reducing biding force exerted on the inner side fulcrum shaft 45 by the slits 24s and 26s by an amount that the retaining force by the lower engaging hook 82 of the center cover 80 shoulders, configure the inner side fulcrum shaft 45 to easily disengage through the slits 24s and 26s. Regarding adjustment of the amount of load causing the inner side fulcrum shaft 45 to disengage in this case, timing of the disengagement can also be easily changed by adjusting engagement force of the lower engaging hook 82 in a similar manner to the method described above.

Further, according to the shaft-support structure of each of the cup holders 40L and 40R disposed to the folding table 10, in addition to the lateral loads F2 and F3, for a load F1 exerted from above on the cup holder 40L and a load F4 directed backward away from the base panel 20, bias also occurs on points of exertion of the loads F1 and F4 on the fulcrum shafts 45 and 46 because of the horizontally asymmetric shaft-support structure described above.

Figure 5B:
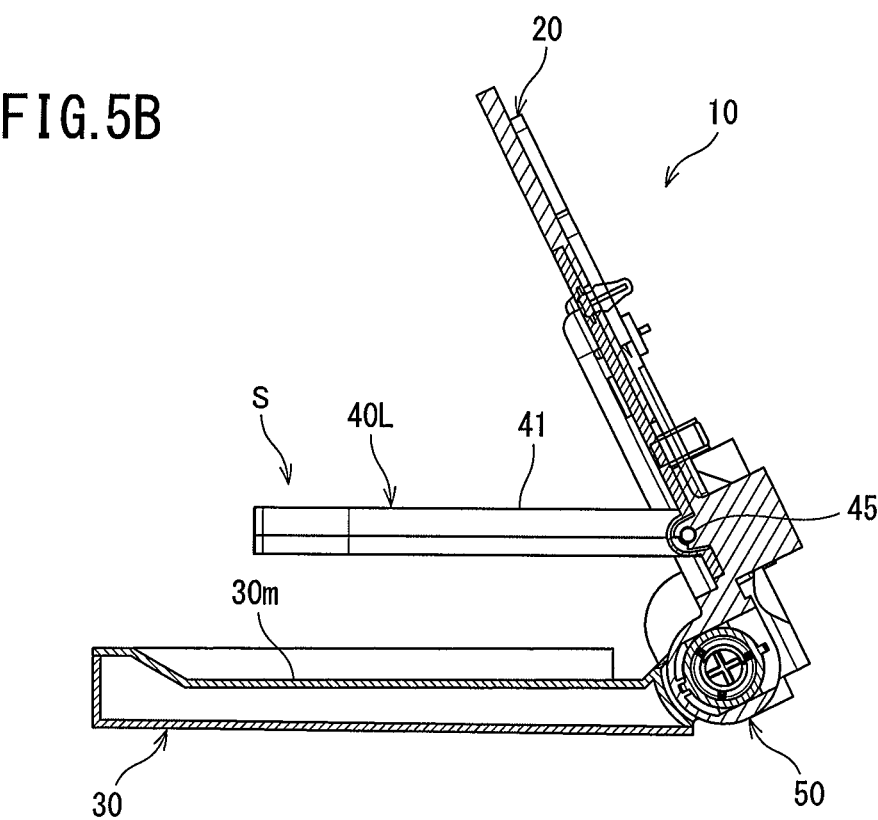
Figure 8A:
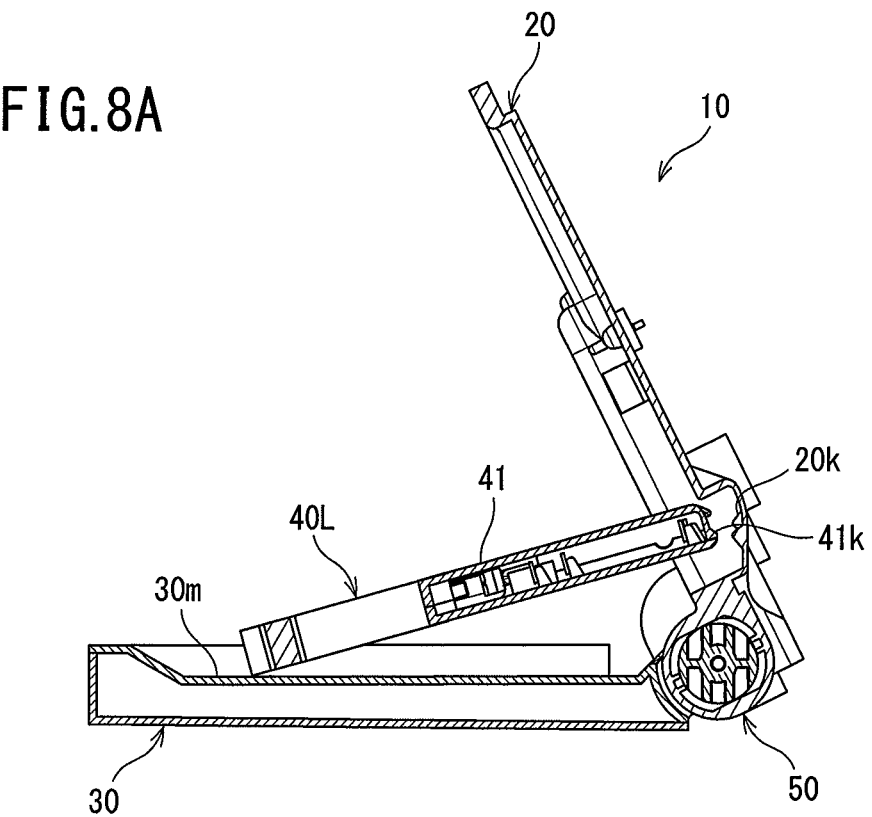
FIGS. 8A and 8B are diagrams descriptive of a fail-safe operation when a load exceeding a predetermined level is exerted on a fulcrum shaft portion of the cup holder, and FIGS. 8A and 8B correspond to FIGS. 5A and 5B, respectively, and illustrate a state when the fail-safe structure has worked.
Figure 8B:
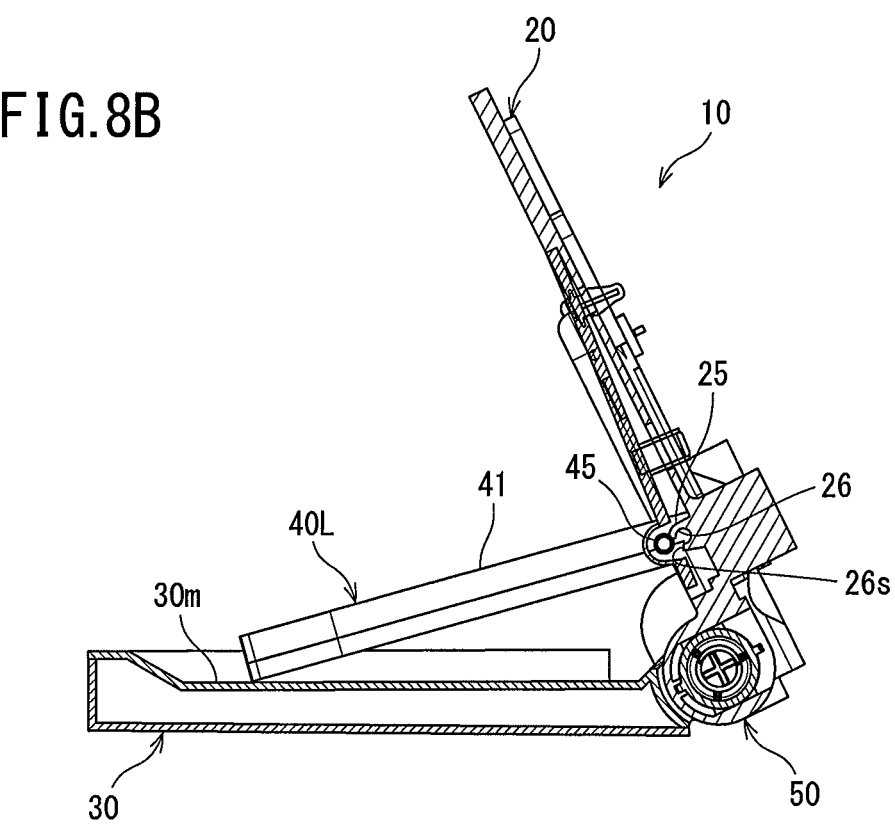

Therefore, when the load F1 or F4 is exerted on each of the cup holders 40L and 40R positioned at the use position S illustrated in FIGS. 5A and 5B, the inner side fulcrum shaft 45 can disengage through the slits 24s and 26s by the same mechanism of action as that when either load F2 or F3 is exerted. This action causes an expected fail-safe operation to work as illustrated in FIGS. 8A and 8B, which enables the shaft-support components, such as the fulcrum shafts 45 and 46, of the cup holder 40L to be prevented or inhibited from being damaged more securely.

Furthermore, according to the shaft-support structure of each of the cup holders 40L and 40R disposed to the folding table 10, since the center cover 80 is disposed in such a way as to cover the two supporting arms 23 and 25 of the inner side bearing portion 22, it is possible to improve external appearance quality of the folding table 10.

As described thus far, the shaft-support structures of the respective cup holders 40L and 40R disposed to the folding table 10 of the present embodiment enable the shaft-support components of the respective cup holders 40L and 40R to be more securely prevented or inhibited from being damaged when a load is exerted on the respective cup holders 40L and 40R. The shaft-support structure for a rotary body according to the present invention is not limited to the above embodiment and various modifications are possible without departing from the spirit and scope of the present invention.

For example, although, in the embodiment described above, an example of applying a shaft-support structure for a rotary body according to the present invention to the cup holders 40L and 40R of the folding table 10 mounted on the rear surface of the backrest of a seat for a vehicle was described, the present invention is not limited to the example.

That is, as long as applied to a cup holder of a folding table, the shaft-support structure for a rotary body according to the present invention is applicable to, for example, a seat for a transportation means mounted on a transportation means other than a vehicle, such as a ship, a train, and an airplane.

It is obvious that the shaft-support structure for a rotary body according to the present invention is applicable to various types of shaft-support structures as long as the shaft-support structure is, without limited to a cup holder of a folding table, a shaft-support structure that includes a bearing portion disposed to a base member and a fulcrum shaft that is disposed to a rotary body and supported by the bearing portion in a rotatable manner, in which, with respect to the base member, the rotary body is rotated about the fulcrum shaft to a first position and a second position.

However, when the rotary body is a cup holder of a folding table mounted on the backrest of a seat for a vehicle, a cup holder of this type has a high necessity to be provided with the shaft-support structure because the cup holder is a site that a passenger is likely to hit and is suitable as a site to which the shaft-support portion fail-safe structure is applied.

In addition, although, in the embodiment described above, an example in which, for example, each of the cup holders 40L and 40R includes the first supporting arm 23 as a restricting portion that is disposed to the inner side bearing portion 22 of the two bearing portions 22 and 27 and is elastically deformable was described, the present invention is not limited to the example.

That is, the first supporting arm 23, which functions as a restricting portion, may be disposed to either or both of the two bearing portions 22 and 27. Further, with regard to the bearing portion on the opposite side to the side where the first supporting arm(s) 23 is/are disposed, axial length of the fulcrum shaft corresponding to the opposite-side bearing portion may be shortened so that the fulcrum shaft disengages from the opposite-side bearing portion.

Even with such a configuration, when a load exceeding a predetermined level is exerted on either of the cup holders 40L and 40R from the opposite side to the bearing portions 22 and 27 to which the first supporting arm(s) 23 is/are disposed, the first supporting arm(s) 23 elastically deform(s) in such a way that the either of the cup holders 40L and 40R moves to the side where the first supporting arm(s) 23 is/are disposed, which enables the fulcrum shaft corresponding to the bearing portion on the opposite side to the side where the first supporting arm(s) 23 is/are disposed to disengage from the opposite-side bearing portion.

REFERENCE SIGNS LIST

10 Folding table
20 Base panel(base member)

21 Front surface of the base panel
22 Inner side bearing portion (bearing portion)
23 First supporting arm (restricting portion)
24 First bearing surface
24s First slit
25 Second supporting arm
26 Second bearing surface
26s Second slit
27 Outer side bearing portion (bearing portion)
28 Bulging portion
29 Supporting hole
30 Table main body
30m Table mounting-surface
40L, 40R Cup holder (rotary body)
41 Holder main body
42 Fixed arm
43 Rotary arm
45 Inner side fulcrum shaft (fulcrum shaft)
46 Outer side fulcrum shaft (fulcrum shaft)
50 Hinge mechanism
51 Cam body pair
53 Coil spring
60 Hook unit
61 Hook
65 Engagement hole
66 Push button
70 Hinge case
80 Center cover (restricting member, cover body)
81 Bulging portion
82 Lower engaging hook
83 Upper engaging hook
CL Fulcrum axis
CLh axis
U Use attitude
K Cup insertion portion

The invention claimed is:

1. A shaft-support structure for a rotary body, the shaft-support structure comprising: a bearing portion disposed to a base member; and a fulcrum shaft disposed to the rotary body and supported by the bearing portion in a rotatable manner, the rotary body being rotated with respect to the base member about the fulcrum shaft to a first position and a second position, the shaft-support structure comprising:
   a slit disposed to the bearing portion and opened in a direction away from the base member; and
   a restricting member disposed at a position facing the slit in such a way as to cover the slit,
   wherein the rotary body is configured in such a way that, when a load exceeding a predetermined level and directed away from the base member is exerted on the rotary body, the fulcrum shaft moves in a direction in which the fulcrum shaft disengages from inside the bearing portion through the slit and, by the fulcrum shaft having moved pressing the restricting member from inside and the restricting member moving in a direction separating from the bearing portion, the fulcrum shaft disengages from the bearing portion.

2. The shaft-support structure for a rotary body according to claim 1, wherein
   the restricting member is a cover body covering the bearing portion and is retained to the base member in an attachable and detachable manner.

3. A shaft-support structure for a rotary body, the shaft-support structure comprising: two bearing portions coaxially disposed to a base member; and
   two fulcrum shafts disposed on right and left side surfaces of the rotary body and respectively supported by the two bearing portions in a rotatable manner, the rotary body being rotated with respect to the base member about the two fulcrum shafts to a first position and a second position, the shaft-support structure comprising
   an elastically deformable restricting portion disposed to at least one bearing portion of the two bearing portions,
   wherein, when a load exceeding a predetermined level is exerted on the rotary body in a direction from the other bearing portion to the one bearing portion, the restricting portion is configured to elastically deform in such a way that the rotary body moves toward the one bearing portion and one of the two fulcrum shafts corresponding to the other bearing portion is configured to disengage from the other bearing portion.

4. The shaft-support structure for a rotary body according to claim 3 further comprising
   a cover body configured to cover the one bearing portion and the restricting portion.

5. The shaft-support structure for a rotary body according to claim 3, wherein
   a fulcrum shaft corresponding to the other bearing portion has an axial length shorter than a fulcrum shaft corresponding to the one bearing portion.

6. The shaft-support structure for a rotary body according to claim 1, wherein
   the rotary body is a cup holder of a folding table mounted on a backrest of a seat for a vehicle.

7. The shaft-support structure for a rotary body according to claim 4, wherein
   a fulcrum shaft corresponding to the other bearing portion has an axial length shorter than a fulcrum shaft corresponding to the one bearing portion.

8. The shaft-support structure for a rotary body according to claim 2, wherein
   the rotary body is a cup holder of a folding table mounted on a backrest of a seat for a vehicle.

9. The shaft-support structure for a rotary body according to claim 3, wherein
   the rotary body is a cup holder of a folding table mounted on a backrest of a seat for a vehicle.

10. The shaft-support structure for a rotary body according to claim 4, wherein
    the rotary body is a cup holder of a folding table mounted on a backrest of a seat for a vehicle.

11. The shaft-support structure for a rotary body according to claim 5, wherein
    the rotary body is a cup holder of a folding table mounted on a backrest of a seat for a vehicle.

12. The shaft-support structure for a rotary body according to claim 7, wherein
    the rotary body is a cup holder of a folding table mounted on a backrest of a seat for a vehicle.

* * * * *